W. CHURCHILL.
SIGNALING LENS.
APPLICATION FILED FEB. 3, 1910. RENEWED MAR. 8, 1912.
1,033,782.
Patented July 30, 1912.
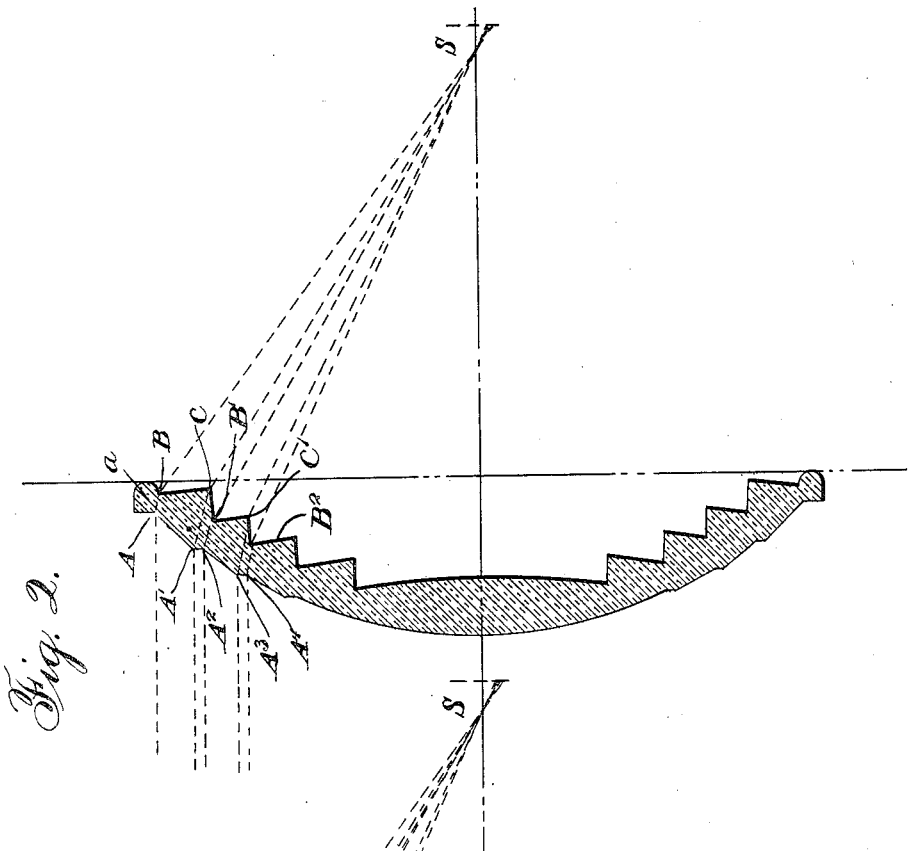
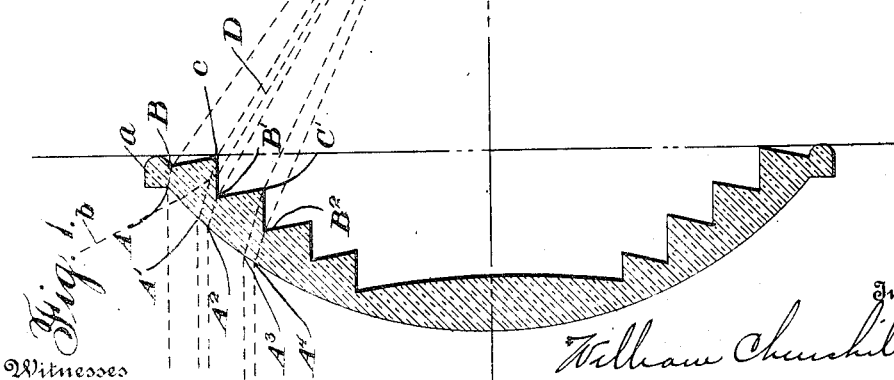

UNITED STATES PATENT OFFICE.

WILLIAM CHURCHILL, OF CORNING, NEW YORK, ASSIGNOR TO CORNING GLASS WORKS, OF CORNING, NEW YORK, A CORPORATION OF NEW YORK.

SIGNALING-LENS.

1,033,782. Specification of Letters Patent. Patented July 30, 1912.

Application filed February 3, 1910, Serial No. 541,835. Renewed March 3, 1912. Serial No. 682,516.

*To all whom it may concern:*

Be it known that I, WILLIAM CHURCHILL, a citizen of the United States, residing at Corning, in the county of Steuben and State of New York, have invented certain new and useful Improvements in Signaling-Lenses, of which the following is a specification.

My invention has for its object to provide an improved construction of lens of the so called Fresnel type, whereby the loss of light, due to the dispersion thereof by the miters on the rear face thereof, may be reduced without increasing the thickness of the lens, and for this purpose it consists in a novel shaping of the front surface of the lens as will be hereinafter more fully described and claimed.

Referring to the accompanying drawings, in which corresponding parts are designated by similar marks of reference: Figure 1 is a diagram representing a railway semaphore lens of the type now commonly used, illustrating the defects which I wish to overcome. Fig. 2 is a diagram of a similar lens constructed in accordance with this invention.

The lenses now in common use for railway semaphores, and upon which this invention is an improvement have a convex front or emission face and a rear face composed of a series of zones, the zones being connected by annular surfaces or miters more or less nearly parallel with the axis of the lens. As in practice such lenses are made by pressing the annular surfaces have, in order to permit the flanges to be withdrawn from the mold, been formed as surfaces of cones, which apices are located in front of the lens, and are thus at more or less of an angle to the incident rays and at such angles that the rays falling thereon are refracted thereby and projected out at the edges of the lens.

In Fig. 1 I have represented such prior construction diagrammatically and in this A, A', A², A³, etc., represent the exterior or front surface of a lens, the rear face of which is composed of the zones B—C, B'—C', etc., the several zones being united by the annular faces or miters B'—C, B²—C', etc., such surfaces being parts of the sides of zones whose apices are in front of the lens. As represented therein any ray, such as D S of light issuing from the source S and falling on the faces B'—C, B²—C', etc., is refracted at D and projected out of the lens on the line $a\ b$, the angle of such projection being so great as to render such ray generally useless for the purpose for which the lenses are used, this also producing a series of concentric dark bands or zones A'—A², A³—A⁴, at the front of the lens. It will be further seen with the construction shown in this figure, in which the anterior face of the lens consists of an unbroken surface, that the number of rays falling upon the miters B'—C, B²—C', etc., and thus lost will depend directly on the height thereof and that with any given curvature of the front face, the height of these cannot be reduced without increasing the thickness of the glass, to avoid which this type of lens is employed.

My invention has for its object to permit such a decrease in the height of the miters without causing thereby any increase in the thickness of the lens, and to thus cause some of the rays which in the old construction fell thereon, to fall upon the zones B—C, B'—C', by which they are properly refracted and this I accomplish by a shaping of the front or anterior face of the lens and more particularly those parts A'—A², A³—A⁴, thereof which form the dark zones before referred to. I have shown such a lens in Fig. 2, the lens represented there being interchangeable with the lens shown in Fig. 1. In this figure as will be seen the anterior face of the lens is made of a series of zones A—A', A²—A³, etc., each having a curvature similar to the curvature of the corresponding part of the lens of Fig. 1, but in lieu of uniting such zones by continuing the curvature of each zone until it meets the curvature of the adjacent zone, as is the case in Fig. 1, I unite such zones by zones A' A², A³ A⁴ of less curvature than the zones which they unite, the faces of such zones being by preference flat and substantially normal to the axis of the lens. Thus each refracting zone has its outer edge A², A⁴, etc., located in the rear of where it would otherwise be. I am thus enabled to reduce the height of the miters B'—C, B²—C', without increasing the thickness of the lens, which as before stated is desirable. It will be noted that the parts of the anterior face of the lens, which are modified according to this invention are the dark zones A'—A², A³—A⁴, from which no rays issue, and that I do not therefore by so doing affect the focusing of the lens.

While I have described my invention as applied to a semaphore lens it will be understood that it is not restricted to lenses used for this purpose but is generally applicable to lenses of similar construction. It may not be necessary to provide the flat faces opposite each of the miters, as the loss resulting from such miters decreases as the miters approach the axis of the lens and hence a miter of the usual depth close to such axis is not objectionable.

Having thus described my invention, what I claim and desire to secure by Letters Patent is:—

1. The herein described lens having a series of miter and refracting zones upon its rear surface, and having a series of refracting zones upon its front face connected by zones of less curvature located in the dark zones produced by the miters.

2. The herein described lens having a series of miters and refracting zones upon its rear surface, and a series of refracting zones upon its front surface connected by zones having surfaces substantially normal to the axis of the lens and located in the dark zones formed by the miters.

WILLIAM CHURCHILL.

Witnesses:
MARION A. WHITLOCK,
R. H. CURTIS.